US012614074B2

(12) United States Patent
Aripirala et al.

(10) Patent No.: US 12,614,074 B2
(45) Date of Patent: Apr. 28, 2026

(54) METHOD AND SYSTEM FOR PREDICTING FUEL CONSUMPTION FOR A FLIGHT OF AN AIRCRAFT

(71) Applicant: The Boeing Company, Arlington, VA (US)

(72) Inventors: Chaitanya Pavan Kumar Aripirala, Bangalore (IN); Veeresh Kumar Masaru Narasimhulu, Bangalore (IN); Satyendra Yadav, Lone Tree, CO (US)

(73) Assignee: The Boeing Company, Arlington, VA (US)

( * ) Notice: Subject to any disclaimer, the term of this patent is extended or adjusted under 35 U.S.C. 154(b) by 656 days.

(21) Appl. No.: 18/181,511

(22) Filed: Mar. 9, 2023

(65) Prior Publication Data

US 2024/0303481 A1     Sep. 12, 2024

(51) Int. Cl.
*G06F 7/00* (2006.01)
*G06F 16/00* (2019.01)
*G06N 3/08* (2023.01)

(52) U.S. Cl.
CPC ...................................... *G06N 3/08* (2013.01)

(58) Field of Classification Search
None
See application file for complete search history.

(56) References Cited

U.S. PATENT DOCUMENTS

2021/0125512 A1* 4/2021 Costas ................... G06Q 50/40
2022/0139232 A1* 5/2022 Lopez Leones ......... G08G 5/21
340/971

FOREIGN PATENT DOCUMENTS

EP    3907661 A1    11/2021
EP    3992944 A1    5/2022

OTHER PUBLICATIONS

Extended European Search Report issued Jul. 1, 2024, in corresponding European Application No. 24159715.2.

* cited by examiner

*Primary Examiner* — Tuan A Pham
(74) *Attorney, Agent, or Firm* — Harrity & Harrity, LLP

(57) ABSTRACT
A method and system for predicting a fuel consumption of an aircraft is disclosed. First, a centralized machine learning model is built and trained using available public data. A version of the centralized model is then sent to one or more edge computing devices controlled by entities that own aircraft, and they input their proprietary data into the version of the centralized model they receive. The received version of the centralized model is trained using the proprietary data and a neural network gain for the centralized machine learning model is determined based on a weighted average of edge neural network gains from the edge computing devices. This neural network gain is used to further train the centralized model to give a more accurate prediction of the fuel consumption without the centralized machine learning model actually ever receiving and being trained with the proprietary data of the airlines and other entities.

20 Claims, 6 Drawing Sheets

400

ACCESSING, BY ONE OR MORE PROCESSORS IN COMMUNICATION WITH A NON-TRANSITORY COMPUTER READABLE MEDIUM HAVING EXECUTABLE INSTRUCTIONS THEREIN, A PLURALITY OF DATA POINTS COMPRISING HISTORICAL FLIGHTS FOR AIRCRAFT TRAVELING FROM A DEPARTURE AIRPORT TO AN ARRIVAL AIRPORT.     402

BUILDING A CENTRAL MACHINE LEARNING MODEL FOR PREDICTING THE FUEL CONSUMPTION FOR THE FLIGHT OF THE AIRCRAFT USING THE DATA POINTS, THE CENTRAL MACHINE LEARNING MODEL BUILT USING A MACHINE LEARNING ALGORITHM AND ONE OR MORE OF THE PLURALITY OF DATA POINTS.     404

GENERATING, BY THE CENTRAL MACHINE LEARNING MODEL, A FIRST PREDICTION OF THE FUEL CONSUMPTION FOR THE FLIGHT OF THE AIRCRAFT.     406

DISTRIBUTING A VERSION OF THE CENTRAL MACHINE LEARNING MODEL ALONG WITH THE FIRST PREDICTION OF THE FUEL CONSUMPTION TO ONE OR MORE EDGE COMPUTING DEVICES, EACH OF THE ONE OR MORE EDGE COMPUTING DEVICES BEING ASSOCIATED WITH AN ORGANIZATION THAT OPERATES THE AIRCRAFT, AND BEING IN COMMUNICATION WITH A DATA STORE COMPRISING ORGANIZATION-SPECIFIC DATA USABLE BY THE ONE OR MORE EDGE COMPUTING DEVICES ASSOCIATED WITH THE ORGANIZATION TO TRAIN THE VERSION OF THE CENTRAL MACHINE LEARNING MODEL RECEIVED THEREBY WITH THE ORGANIZATION-SPECIFIC DATA.     408

RECEIVING, AT THE CENTRAL MACHINE LEARNING MODEL FROM THE ONE OR MORE EDGE COMPUTING DEVICES, A NEURAL NETWORK GAIN BETWEEN THE FIRST PREDICTION AND AN ORGANIZATION-SPECIFIC PREDICTION OF THE FUEL CONSUMPTION FOR THE FLIGHT OF THE AIRCRAFT GENERATED BY THE VERSION OF THE CENTRAL MACHINE LEARNING MODEL TRAINED WITH THE ORGANIZATION-SPECIFIC DATA. THE NEURAL NETWORK GAIN BEING BASED ON A WEIGHTED DIFFERENCE BETWEEN THE FIRST PREDICTION AND THE ORGANIZATION-SPECIFIC PREDICTION AND AN ACTUAL FUEL CONSUMPTION FOR THE FLIGHT FROM THE DEPARTURE AIRPORT TO THE ARRIVAL AIRPORT.     410

UPDATING THE CENTRAL MACHINE LEARNING MODEL BASED ON THE NEURAL NETWORK GAIN FROM THE ONE OR MORE EDGE COMPUTING DEVICES TO GENERATE A REVISED PREDICTION OF THE FUEL CONSUMPTION FOR THE FLIGHT OF THE AIRCRAFT.     412

100
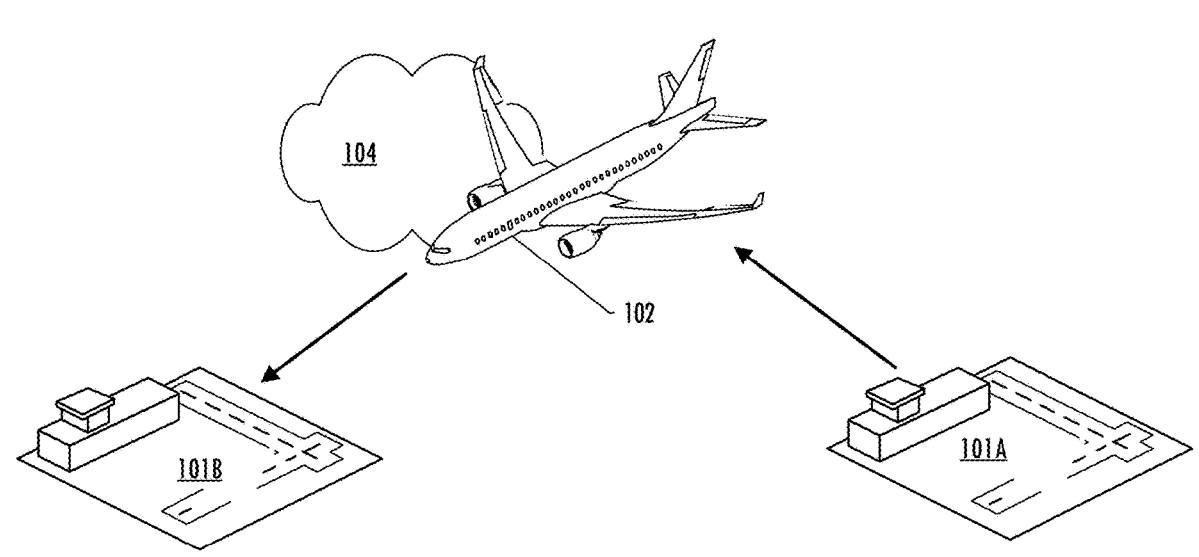
FIG. 1

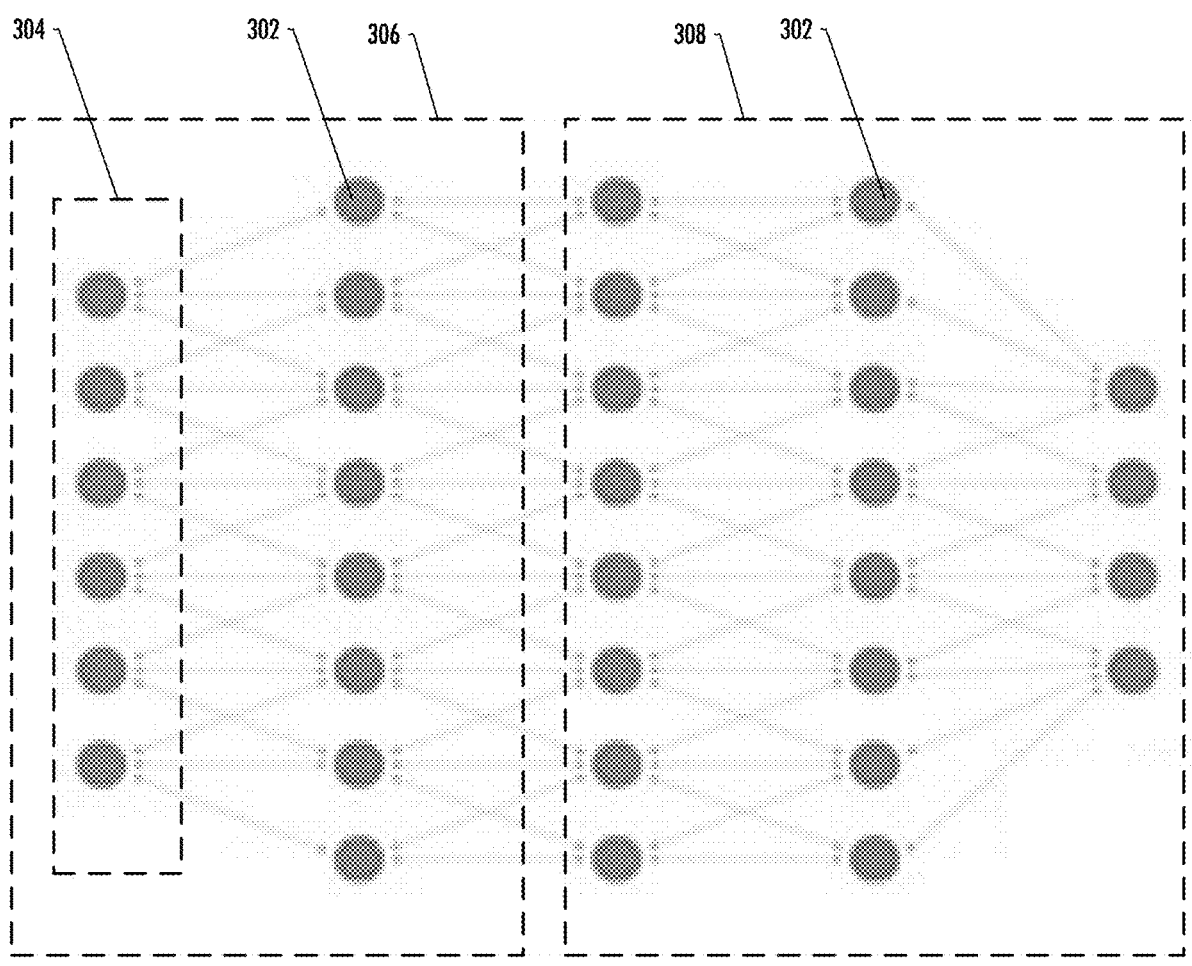
FIG. 3A

350 →

| Model | Average Predicted Fuel Flow (kg/hr) | Average Actual Fuel Flow (kg/hr) | Prediction Error (kg/hr) | Accuracy Improvement (kg/hr) | Neural Network Gain | Accuracy Improvement | Ranked Weight | Weighted Network Gain |
|---|---|---|---|---|---|---|---|---|
| Generic Aircraft | 11000 | 10000 | 1000 | | | | | |
| MSN1 | 9800 | 10000 | 200 | 800 | 1.5 | 800 | 0.5 | 0.75 |
| MSN2 | 10500 | 10000 | 500 | 500 | 2 | 500 | 0.3125 | 0.625 |
| MSN3 | 9300 | 10000 | 700 | 300 | 1.8 | 300 | 0.1875 | 0.3375 |
| | | | | Simple Average | 1.77 | | | |
| | | | | | | | Sum of Weighted Network Gains | 1.71 |
| | | | | | | | Ranked Weighted Average Neural Network Gain | 1.71 |

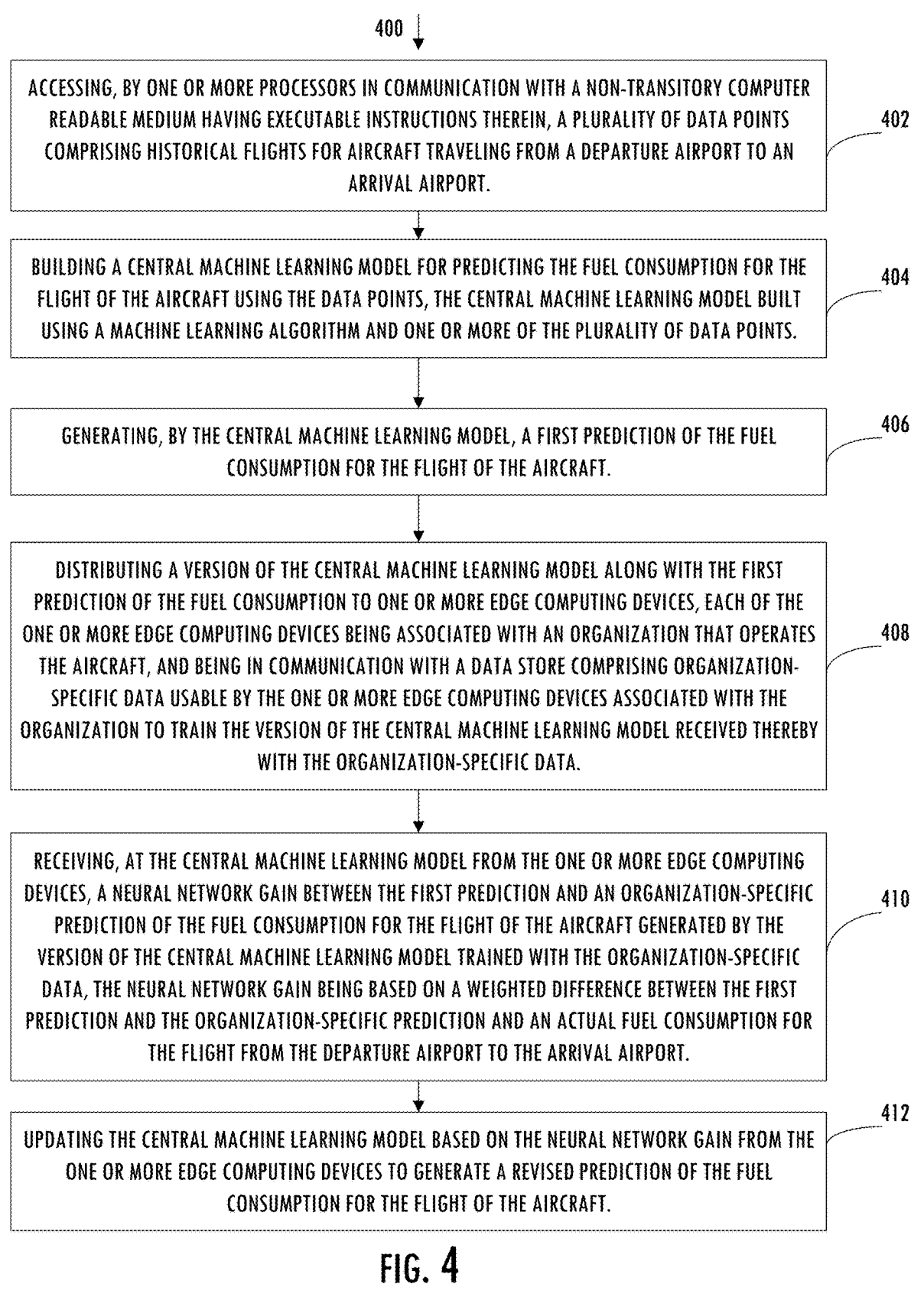

ACCESSING, BY ONE OR MORE PROCESSORS IN COMMUNICATION WITH A NON-TRANSITORY COMPUTER READABLE MEDIUM HAVING EXECUTABLE INSTRUCTIONS THEREIN, A PLURALITY OF DATA POINTS COMPRISING HISTORICAL FLIGHTS FOR AIRCRAFT TRAVELING FROM A DEPARTURE AIRPORT TO AN ARRIVAL AIRPORT. — 402

BUILDING A CENTRAL MACHINE LEARNING MODEL FOR PREDICTING THE FUEL CONSUMPTION FOR THE FLIGHT OF THE AIRCRAFT USING THE DATA POINTS, THE CENTRAL MACHINE LEARNING MODEL BUILT USING A MACHINE LEARNING ALGORITHM AND ONE OR MORE OF THE PLURALITY OF DATA POINTS. — 404

GENERATING, BY THE CENTRAL MACHINE LEARNING MODEL, A FIRST PREDICTION OF THE FUEL CONSUMPTION FOR THE FLIGHT OF THE AIRCRAFT. — 406

DISTRIBUTING A VERSION OF THE CENTRAL MACHINE LEARNING MODEL ALONG WITH THE FIRST PREDICTION OF THE FUEL CONSUMPTION TO ONE OR MORE EDGE COMPUTING DEVICES, EACH OF THE ONE OR MORE EDGE COMPUTING DEVICES BEING ASSOCIATED WITH AN ORGANIZATION THAT OPERATES THE AIRCRAFT, AND BEING IN COMMUNICATION WITH A DATA STORE COMPRISING ORGANIZATION-SPECIFIC DATA USABLE BY THE ONE OR MORE EDGE COMPUTING DEVICES ASSOCIATED WITH THE ORGANIZATION TO TRAIN THE VERSION OF THE CENTRAL MACHINE LEARNING MODEL RECEIVED THEREBY WITH THE ORGANIZATION-SPECIFIC DATA. — 408

RECEIVING, AT THE CENTRAL MACHINE LEARNING MODEL FROM THE ONE OR MORE EDGE COMPUTING DEVICES, A NEURAL NETWORK GAIN BETWEEN THE FIRST PREDICTION AND AN ORGANIZATION-SPECIFIC PREDICTION OF THE FUEL CONSUMPTION FOR THE FLIGHT OF THE AIRCRAFT GENERATED BY THE VERSION OF THE CENTRAL MACHINE LEARNING MODEL TRAINED WITH THE ORGANIZATION-SPECIFIC DATA, THE NEURAL NETWORK GAIN BEING BASED ON A WEIGHTED DIFFERENCE BETWEEN THE FIRST PREDICTION AND THE ORGANIZATION-SPECIFIC PREDICTION AND AN ACTUAL FUEL CONSUMPTION FOR THE FLIGHT FROM THE DEPARTURE AIRPORT TO THE ARRIVAL AIRPORT. — 410

UPDATING THE CENTRAL MACHINE LEARNING MODEL BASED ON THE NEURAL NETWORK GAIN FROM THE ONE OR MORE EDGE COMPUTING DEVICES TO GENERATE A REVISED PREDICTION OF THE FUEL CONSUMPTION FOR THE FLIGHT OF THE AIRCRAFT. — 412

FIG. 4

METHOD AND SYSTEM FOR PREDICTING FUEL CONSUMPTION FOR A FLIGHT OF AN AIRCRAFT

BACKGROUND

Field of the Disclosure

The present disclosure is generally related to predicting fuel consumption for aircraft. More particularly, the present disclosure relates to machine learning assisted predictions of fuel consumption during a flight of aircraft.

Description of Related Art

Fuel is the most expensive recurring operating cost for an airline. A small savings in fuel has a profound impact on the profitability of an airline. Airlines constantly collect and analyze data to gain insights into fuel consumption patterns to be better able to predict fuel needs from operating and purchasing strategy points of view.

While predicting fuel required is beneficial to efficient and profitable operations, the data required to predict fuel consumption of airlines is highly business sensitive. There is some publicly available data, but the data is mainly limited in breadth which in turn limits the accuracy of a machine learning model due to a limited feature set. Access to more relevant data becomes a hurdle due to data privacy and data ownership, and also data sharing between airlines is not feasible due to competitive business models.

Currently, flight dispatchers use empirical methods to calculate flight fuel consumptions based on flight plan and weather on the day before the flight. However, this method does not take into account all the factors that affect the fuel consumption of an aircraft. Also, insights from patterns of other aircraft are not taken into account. Current openly known machine learning solutions follow a centralized approach to build the model where all data is processed in a central location which has the following drawbacks: data will need to be shared by airlines which would be a major point of concern; with limited data and set of features the accuracy of the prediction model would be limited and would be unreliable in most cases; and data access rights would be an issue as the key tenet of a centralized model is to have access to data.

It would therefore be desirable to have a system and method that takes into account at least some of the issues discussed above, as well as other possible issues.

SUMMARY

Example implementations of the present disclosure are directed to a method and system for predicting a fuel consumption for a flight of an aircraft from a departure airport to an arrival airport. A centralized machine learning model is built and trained using available public data, such as time of day, airline, location, flight distance, departure and arrival data points, environmental conditions, and filed flight plans containing historical fuel consumption of the aircraft. A version of the centralized model is then sent to one or more airlines or other entities, referred to as edge computing devices, who control the aircraft and they input their proprietary data into the version of the centralized model they receive. The received version of the centralized model is trained using the proprietary data of each airline or other entity and a neural network gain for the centralized machine learning model is determined based on a weighted average of edge neural network gains of the versions of the centralized model that are sent to the edges. This neural network gain is then used to further train the centralized model to give a more accurate prediction of the fuel consumption without the centralized machine learning model actually ever receiving and being trained with the proprietary data of the airlines and other entities.

The present disclosure thus includes, without limitation, the following example implementations.

Some example implementations provide a method for predicting a fuel consumption for a flight of an aircraft from a departure airport to an arrival airport, the method comprising: accessing, by one or more processors in communication with a non-transitory computer readable medium having executable instructions therein, a plurality of data points comprising historical flights from the departure airport to the arrival airport, wherein, upon execution of the executable instructions, the one or more processors are configured to perform steps comprising: building a central machine learning model for predicting the fuel consumption for the flight of the aircraft using the data points, the central machine learning model built using a machine learning algorithm and one or more of the plurality of data points; generating, by the central machine learning model, a first prediction of the fuel consumption for the flight of the aircraft; distributing a version of the central machine learning model along with the first prediction of the fuel consumption to one or more edge computing devices, each of the one or more edge computing devices being associated with an organization that operates the aircraft, and being in communication with a data store comprising organization-specific data usable by the one or more edge computing devices associated with the organization to train the version of the central machine learning model received thereby with the organization-specific data; receiving, at the central machine learning model from the one or more edge computing devices, a neural network gain between the first prediction and an organization-specific prediction of the fuel consumption for the flight of the aircraft generated by the version of the central machine learning model trained with the organization-specific data, the neural network gain being based on a weighted difference between the first prediction and the organization-specific prediction and an actual fuel consumption for the flight from the departure airport to the arrival airport; and updating the central machine learning model based on the neural network gain from the one or more edge computing devices to generate a revised prediction of the fuel consumption for the flight of the aircraft.

In some example implementations of the method of any preceding example implementation, or any combination thereof, the plurality of data points includes public data selected from the group consisting of: time of day, airline, location, flight distance, departure and arrival data points, environmental conditions, and filed flight plans containing historical fuel consumption of the aircraft.

In some example implementations of the method of any preceding example implementation, or any combination thereof, the organization-specific data includes proprietary data associated with the organization selected from the group consisting of: an actual flight plan of the aircraft including speed and altitude of the aircraft, weather along the flight plan, passenger reservation information for the aircraft, cargo weight for the aircraft, fuel weight for the aircraft, performance characteristics of the aircraft, and airline or organization control decisions.

In some example implementations of the method of any preceding example implementation, or any combination thereof, the central machine learning model is a deep neural network (DNN) model containing a first number of layers and neurons, the first number of layers and neurons corresponding to the plurality of data points, wherein the method further comprises training the DNN model using the first number of layers and neurons corresponding to the plurality of data points.

In some example implementations of the method of any preceding example implementation, or any combination thereof, the version of the central machine learning model includes the DNN model further trained by the one or more edge computing devices using the organization-specific data, wherein the DNN model further trained by the one or more edge computing devices using the organization-specific data includes the first number of layers and neurons and a second number of layers and neurons corresponding to the organization-specific data.

In some example implementations of the method of any preceding example implementation, or any combination thereof, further comprising: receiving, by the central machine learning model, edge neural network gains from two or more edge computing devices, wherein updating the central machine learning model based on the neural network gain comprises: determining an accuracy of the organization-specific prediction generated by each of the two or more edge computing devices by determining a difference between the organization-specific prediction and the actual fuel consumption for the flight; and assigning, by the one or more processors, a different weight to each of the edge neural network gains received from the two or more edge computing devices based on the difference, wherein each of the different weights is assigned to a corresponding one of the two or more edge computing devices in descending order where a highest weight is assigned to the edge computing device that produced the organization-specific prediction with a smallest difference, and a lowest weight is assigned to the edge computing device that produced the organization-specific prediction with a largest difference, wherein the neural network gain is calculated using a weighted average of the edge neural network gains received from the two or more edge computing devices based on the different weights assigned to the two or more edge computing devices; and wherein updating the central machine learning model based on the neural network gain comprises training the central machine learning model to generate the revised prediction using the neural network gain calculated using the weighted average.

In some example implementations of the method of any preceding example implementation, or any combination thereof, each of the one or more edge computing devices determines a corresponding edge neural network gain by: executing multiple training iterations to train the version of the central machine learning model, wherein at a first training iteration, a random neural network gain is applied to the version of the central machine learning model, and a first iteration of the organization-specific prediction is generated based on the random neural network gain; and at subsequent training iterations, updating the random neural network gain to obtain the corresponding edge neural network gain of the edge computing device and applying the corresponding edge neural network gain to the version of the central machine learning model, and generating subsequent iterations of the organization-specific prediction based on the corresponding edge neural network gain.

In some example implementations of the method of any preceding example implementation, or any combination thereof, updating the random neural network gain comprises: performing a comparison of the first iteration of the organization-specific prediction to the actual fuel consumption for the flight; and updating the random neural network gain to the corresponding edge neural network gain based on the comparison.

In some example implementations of the method of any preceding example implementation, or any combination thereof, receiving the edge neural network gains comprises receiving each of the corresponding edge neural network gains from the one or more edge computing devices by the central machine learning model.

Some other example implementations provide a system for predicting a fuel consumption for a flight of an aircraft from a departure airport to an arrival airport, the system comprising: one or more processors in communication with a non-transitory computer readable medium having executable instructions therein, wherein, upon execution of the executable instructions, the one or more processors are configured to: access a plurality of data points comprising historical flights from the departure airport to the arrival airport; build a central machine learning model for predicting the fuel consumption for the flight of the aircraft using the data points, the central machine learning model built using a machine learning algorithm and one or more of the plurality of data points; generate, using the central machine learning model, a first prediction of the fuel consumption for the flight of the aircraft; distribute a version of the central machine learning model along with the first prediction of the fuel consumption to one or more edge computing devices, each of the one or more edge computing devices being associated with an organization that operates the aircraft, and being in communication with a data store comprising organization-specific data usable by the one or more edge computing devices associated with the organization to train the version of the central machine learning model received thereby with the organization-specific data; receive, at the central machine learning model from the one or more edge computing devices, a neural network gain between the first prediction and an organization-specific prediction of the fuel consumption for the flight of the aircraft generated by the version of the central machine learning model trained with the organization-specific data, the neural network gain being based on a weighted difference between the first prediction and the organization-specific prediction and an actual fuel consumption for the flight from the departure airport to the arrival airport; and update the central machine learning model based on the neural network gain from the one or more edge computing devices to generate a revised prediction of the fuel consumption for the flight of the aircraft.

In some example implementations of the system of any preceding example implementation, or any combination thereof, the plurality of data points includes public data selected from the group consisting of: time of day, airline, location, flight distance, departure and arrival data points, environmental conditions, and filed flight plans containing historical fuel consumption of the aircraft.

In some example implementations of the system of any preceding example implementation, or any combination thereof, the organization-specific data includes proprietary data associated with the organization selected from the group consisting of: an actual flight plan of the aircraft including speed and altitude of the aircraft, weather along the flight plan, passenger reservation information for the aircraft, cargo weight for the aircraft, fuel weight for the aircraft, performance characteristics of the aircraft, and airline or organization control decisions.

In some example implementations of the system of any preceding example implementation, or any combination thereof, the central machine learning model is a deep neural network (DNN) model containing a first number of layers and neurons, the first number of layers and neurons corresponding to the plurality of data points, wherein the one or more processors are configured to train the DNN model using the first number of layers and neurons corresponding to the plurality of data points.

In some example implementations of the system of any preceding example implementation, or any combination thereof, the version of the central machine learning model includes the DNN model further trained by the one or more edge computing devices using the organization-specific data, wherein the DNN model further trained by the one or more edge computing device using the organization-specific data includes the first number of layers and neurons and a second number of layers and neurons corresponding to the organization-specific data.

In some example implementations of the system of any preceding example implementation, or any combination thereof, the DNN model is further trained using the first number of layers and neurons corresponding to the plurality of data points and the second number of layers and neurons corresponding to the organization-specific data.

In some example implementations of the system of any preceding example implementation, or any combination thereof, the one or more processors are further configured to: receive, at the central machine learning model, edge neural network gains from two or more edge computing devices, wherein the one or more processors configured to update the central machine learning model based on the neural network gain comprises: each of the one or more edge computing devices configured to determine an accuracy of the organization-specific prediction generated by each of the two or more edge computing devices by determining a difference between the organization-specific prediction and the actual fuel consumption for the flight of the aircraft; and responsive to receiving the difference, the one or more processors configured to assign a different weight to each of the edge neural network gains received from the two or more edge computing devices based on the difference, wherein each of the different weights is assigned to a corresponding one of the two or more edge computing devices in descending order where a highest weight is assigned to the edge computing device that produced the organization-specific prediction with a smallest difference, and a lowest weight is assigned to the edge computing device that produced the organization-specific prediction with a largest difference, wherein the neural network gain is calculated using a weighted average of the edge neural network gains received from the two or more edge computing devices based on the different weights assigned to the two or more edge computing devices; and wherein the one or more processors configured to update the central machine learning model based on the neural network gain comprises the one or more processors configured to train the central machine learning model to generate the revised prediction using the neural network gain calculated using the weighted average.

In some example implementations of the system of any preceding example implementation, or any combination thereof, each of the one or more edge computing devices is configured to determine a corresponding edge neural network gain, including the one or more edge computing devices configured to: execute multiple training iterations to train the version of the central machine learning model, wherein at a first training iteration, a random neural network gain is applied to the version of the central machine learning model, and a first iteration of the organization-specific prediction is generated based on the random neural network gain; and at subsequent training iterations, update the random neural network gain to obtain the corresponding edge neural network gain of the edge computing device and apply the corresponding edge neural network gain to the version of the central machine learning model, and generate subsequent iterations of the organization-specific prediction based on the corresponding edge neural network gain.

In some example implementations of the system of any preceding example implementation, or any combination thereof, the one or more edge computing devices configured to update the random neural network gain comprises the one or more edge computing devices configured to: perform a comparison of the first iteration of the organization-specific prediction to the actual fuel consumption for the flight; and update the random neural network gain to the corresponding edge neural network gain based on the comparison.

In some example implementations of the system of any preceding example implementation, or any combination thereof, the one or more processors being configured to receive the edge neural network gains comprises the one or more processors being further configured to receive each of the corresponding edge neural network gains from the one or more edge computing devices at the central machine learning model.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

FIG. 1 illustrates an example aircraft flight environment, according to some embodiments of the present disclosure;

FIG. 3A illustrates an example diagram of a neural network, according to some embodiments of the present disclosure;

FIG. 3B illustrates a table demonstrating an example weighted neural network gain determination, according to some embodiments of the present disclosure;

FIG. 4 illustrates a flow chart detailing steps of an example method, according to some embodiments of the present disclosure.

DETAILED DESCRIPTION OF THE DISCLOSURE

Figure 2:
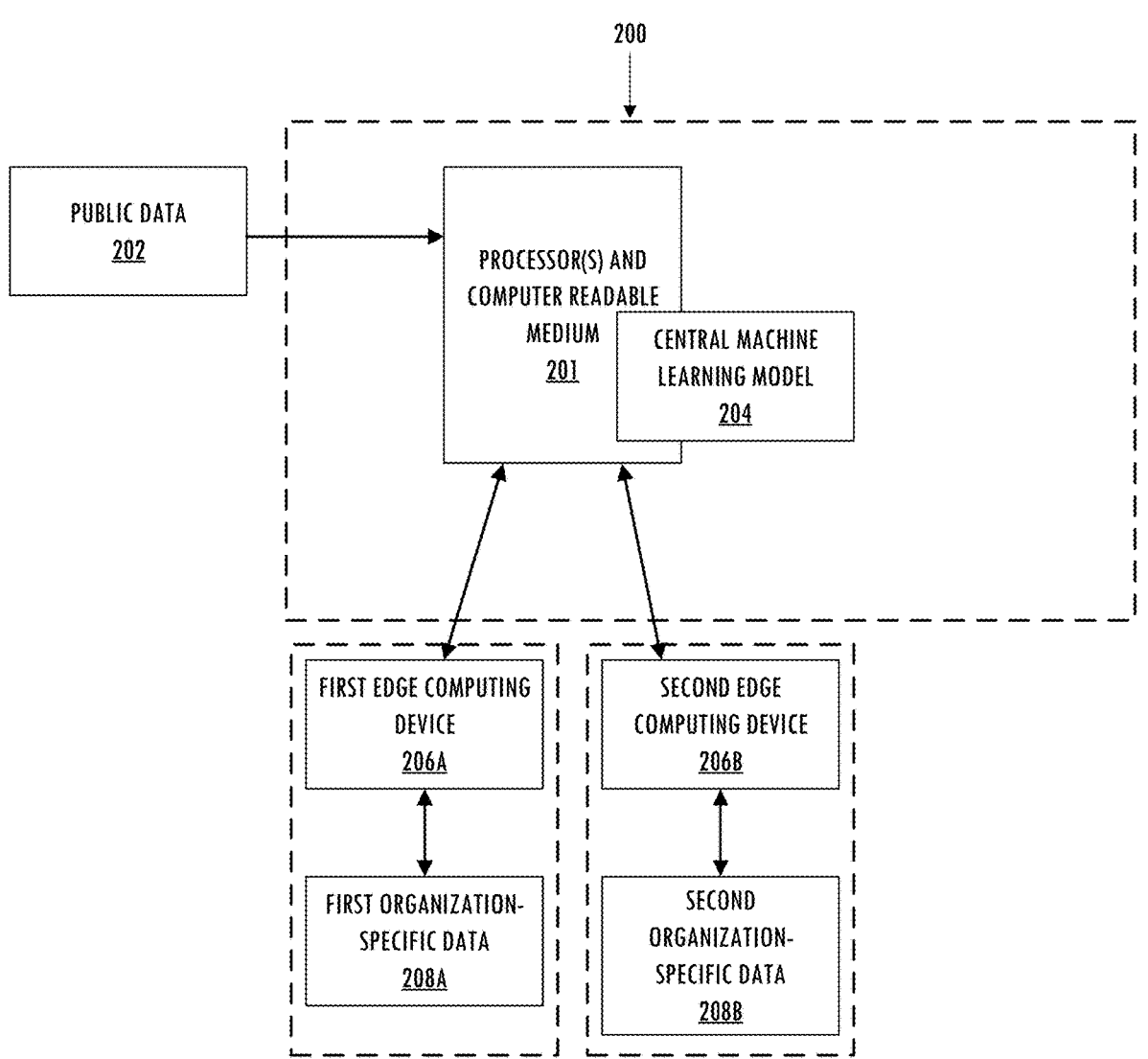
FIG. 2 illustrates a block diagram of an example system for predicting fuel consumption of an aircraft, according to some embodiments of the present disclosure.

Some examples of the present disclosure will now be described more fully hereinafter with reference to the accompanying drawings, in which some, but not all aspects of the disclosure are shown. Indeed, various examples of the disclosure is embodied in many different forms and should not be construed as limited to the examples set forth herein; rather, these examples are provided so that this disclosure will be thorough and complete, and will fully convey the scope of the disclosure to those skilled in the art. For example, unless otherwise indicated, reference to something as being a first, second or the like should not be construed to imply a particular order. Also, something described as being above something else (unless otherwise indicated) is instead below, and vice versa; and similarly, something described as being to the left of something else instead to the right, and vice versa. Like reference numerals refer to like elements throughout.

FIG. 1 illustrates an example aircraft flight environment 100, according to some embodiments of the present disclosure. The example aircraft flight environment includes an aircraft 102 in flight between a departure airport 101A and an arrival airport 101B. While in the air, the aircraft consumes fuel in order to travel from the departure airport to the arrival airport. As described herein, many different factors determine the fuel consumption of the aircraft during the flight. For example, if the aircraft encounters a weather system 104, or some other obstacle, that causes the aircraft to avoid the weather system, the fuel consumption of the aircraft might be greater than if the aircraft were to have flown straight through the area where the weather system is located. As described further herein, publicly available data, such as storm and weather data, is used to help predict fuel consumption of aircraft according to some implementations of the present disclosure.

FIG. 2 illustrates a system 200 for predicting a fuel consumption for a flight of an aircraft from a departure airport to an arrival airport. In some example implementations, the system comprises one or more processors in communication with a non-transitory computer readable medium 201 having executable instructions therein. Upon execution of the executable instructions, the one or more processors are configured to perform various functions described herein. In some example implementations, the one or more processors are configured to access a plurality of data points comprising historical flights from the departure airport to the arrival airport. The plurality of data points are sourced from, for example, public data 202 that any person with internet access is able to obtain. For example, the public data includes data characterizing public fuel consumption information, or information from which fuel consumption is calculated, for aircraft as well as public data selected from the group consisting of: time of day, airline, location, flight distance, departure and arrival data points, environmental conditions, and filed flight plans containing historical fuel consumption of the aircraft.

Fuel consumption has a high degree of correlation with the type of aircraft in question. Therefore, in some implementations of the present disclosure, a system 200 for predicting fuel consumption for a flight is generated per aircraft type (e.g., model of aircraft, number of engines, size, etc.).

The one or more processors 201 are further configured to build a central machine learning model 204 for predicting the fuel consumption for the flight of the aircraft, such as the aircraft 102 flying as illustrated in FIG. 1, using the data points from the public data 202. The central machine learning model is built using a machine learning algorithm and one or more of the plurality of data points. In some example implementations, the one or more processors is configured to generate, using the central machine learning model 204, a first prediction of the fuel consumption for the flight of the aircraft.

As illustrated in FIG. 2, the one or more processors 201 of the system 200 are in communication with one or more edge computing devices, such as first edge computing device 206A and second edge computing device 206B. Each of the one or more edge computing devices are associated with an organization or entity that operates the aircraft. For example, the organization is an airline, private firm, company, or non-profit. The one or more computer processors are configured to distribute a version of the central machine learning model along with the first prediction of the fuel consumption to the one or more edge computing devices. For example, the one or more processors generates the first prediction of the fuel consumption and distributes a version of the central machine learning model, along with the first prediction, to each of the first edge computing device associated with a first airline and the second edge computing device associated with a second airline.

In some implementations, each of the first edge computing device 206A and the second edge computing device 206B is in communication with a corresponding data store comprising organization-specific data usable by the one or more edge computing devices associated with the organization to train the version of the central machine learning model received thereby with the organization-specific data. For example, the first edge computing device is in communication with a first data store 208A containing first organization-specific data and the second edge computing device is in communication with a second data store 208B containing second organization-specific data. The first organization-specific data includes proprietary and business sensitive data characterizing fuel consumption of aircraft associated with the first airline and the second organization-specific data includes proprietary and business sensitive data characterizing fuel consumption of aircraft associated with the second airline. In some implementations, the first organization-specific data and second organization-specific data includes: an actual flight plan of the aircraft including speed and altitude of the aircraft, weather along the flight plan, passenger reservation information for the aircraft, cargo weight for the aircraft, fuel weight for the aircraft, performance characteristics of the aircraft, and airline or organization control decisions.

In some example implementations, the one or more processors 201 are configured to receive, at the central machine learning model 204 from each of the one or more edge computing devices, a neural network gain between the first prediction and an organization-specific prediction of the fuel consumption for the flight of the aircraft generated by the version of the central machine learning model trained with the organization-specific data. For example, each of the first edge computing device 206A and second edge computing device 206B is configured to generate a corresponding organization-specific prediction and calculate a respective edge neural network gain as described further below, and a weighted average of these edge neural network gains is computed by the one or more processors and used to further train the central machine learning model.

In some implementations, the neural network gain is based on a weighted difference between the first prediction and the (or each, if more than one) organization-specific prediction and an actual fuel consumption for the flight from the departure airport to the arrival airport. Once the neural network gain is received, the one or more processors are configured to update the central machine learning model based on the neural network gain from the one or more edge computing devices to generate a revised prediction of the fuel consumption for the flight of the aircraft. In some example implementations, the process described above is iterated one or more times to achieve a revised prediction that becomes more accurate with each iteration. As more organization-specific data is used by the edge computing devices to obtain the edge neural network gains, and thereby the neural network gain, the prediction of the fuel consumption becomes more accurate. Versions of the updated centralized model with the new neural network gain from the edge devices are sent back out to the edge devices for further iterations of the process described herein.

In some example implementations, the one or more processors 201 are further configured to receive, at the central machine learning model 204, edge neural network gains from two or more edge computing devices, such as first edge computing device 206A and second edge computing device 206B. As described above, the one or more processors are configured to update the central machine learning model based on the neural network gain. In some implementations, this comprises the one or more edge computing devices configured to determine an accuracy of the organization-specific prediction generated by each of the two or more edge computing devices by determining a difference between the organization-specific predictions and the actual fuel consumption of the aircraft during the flight. In some implementations, each of the one or more edge computing devices is configured to determine an accuracy of the organization-specific prediction generated by each of the two or more edge computing devices by determining a difference between the organization-specific prediction and the actual fuel consumption of the aircraft during the flight. Each of the edge computing devices then sends the difference to the one or more processors.

Responsive to receiving the difference, the one or more processors 201 are configured to assign a different weight to each of the edge neural network gains received from the two or more edge computing devices based on the difference. The different weights are assigned to a corresponding one of the two or more edge computing devices in descending order where a highest weight is assigned to the edge computing device that produced the organization-specific prediction with a smallest difference, and a lowest weight is assigned to the edge computing device that produced the organization-specific prediction with a largest difference. For example, the first edge computing device 206A generates an organization-specific prediction of the fuel consumption that has a difference of 100 kilograms from the actual fuel consumption of the aircraft and the second edge computing device 206B generates an organization-specific prediction that has a difference of 200 kilograms from the actual fuel consumption of the aircraft. In this example, the second edge computing device would be assigned the lowest weight (i.e., the system 200 will give lower weight to the edge neural network gain generated by the second edge computing device) and the first edge computing device would be assigned the highest weight (i.e., the system 200 will give higher weight to the edge neural network gain generated by the first edge computing device).

In some implementations, the neural network gain used to train the central machine learning model 204 by the system 200 is calculated using a weighted average of the edge neural network gains received from the two or more edge computing devices based on the different weights assigned to the two or more edge computing devices. An example of this weighted average is described in further detail below in the description with respect to FIG. 3B. In some implementations, the one or more processors 201 being configured to update the central machine learning model based on the neural network gain comprises the one or more processors being configured to train the central machine learning model to generate the revised prediction using the neural network gain calculated using the weighted average.

In some implementations, as described above, each of the one or more edge computing devices is configured to determine a corresponding edge neural network gain. This includes each of the one or more edge computing devices being configured to execute multiple training iterations to train the version of the central machine learning model 204 received by the one or more edge computing device, wherein at a first training iteration, a random neural network gain is applied to the version of the central machine learning model, and a first iteration of the organization-specific prediction is generated based on the random neural network gain. Furthermore, at subsequent training iterations, each of the edge computing devices is configured to update the random neural network gain to obtain the corresponding edge neural network gain of the edge computing device and apply the corresponding edge neural network gain to the version of the central machine learning model, and generate subsequent iterations of the organization-specific prediction based on the corresponding edge neural network gain.

In some implementations, the one or more edge computing devices are configured to update the random neural network gain by performing a comparison of the first iteration of the organization-specific prediction to the actual fuel consumption for the flight of the aircraft. Next, the one or more edge computing devices are configured to update the random neural network gain to the corresponding edge neural network gain based on the comparison. Finally, the one or more processors 201 being configured to receive the edge neural network gains includes the one or more processors being further configured to receive each of the corresponding edge neural network gains from the one or more edge computing devices at the central machine learning model 204.

FIG. 3A illustrates an example diagram of a deep neural network (DNN) 300 according to some implementations of the present disclosure. A DNN is an artificial neural network with multiple layers between the input and output layers. As illustrated in FIG. 3A, a layer 304 is represented by a vertical column of neurons 302. A DNN diagram typically characterizes the inputs of the DNN on the left-hand side of the diagram and the outputs on the right-hand side of the diagram. The different layers perform different kinds of transformations on their inputs to arrive at a modeled output. Each neuron performs some function on a data input it receives and then the transformed data is sent to the next layer. In some examples, the central machine learning model 204 is a DNN model containing a first number of layers and neurons 306, the first number of layers and neurons corresponding to the plurality of data points (e.g., public data 202), and performing transformations of data on the plurality of data points. In some implementations, the one or more processors 201 are configured to train the DNN model using the first number of layers and neurons corresponding to the plurality of data points. During specific training, the system of the present disclosure controls the learning/update rate for the generic layer so that the previous learning is not completely overwritten.

FIG. 3A also illustrates a second number of layers and neurons 308 and the version of the central machine learning model includes the DNN model 300 further trained by the one or more edge computing devices using the organization-specific data. That is, the DNN model is further trained by the one or more edge computing device using the second number of layers and neurons corresponding to the organization-specific data. In some implementations, the DNN model is further trained using the first number of layers and neurons corresponding to the plurality of data points and the second number of layers and neurons corresponding to the organization-specific data.

FIG. 3B illustrates a table 350 demonstrating an example model training that helps understand how the weighted neural network gain described herein is calculated. The weighted neural network gain described above is equal to the ranked weighted average neural network gain in the table, and is used by the central machine learning model 204 to generate the revised prediction. The table includes a list of aircraft fuel consumption data and the neural network gain, ranked weight, weighted network gain, and ranked weighted average neural network gain. The first column of the table includes a first entry of a generic random aircraft, and starts the model with a random prediction of the fuel consumption, in this example, 11,000 kilograms of fuel per hour (kg/hr) of fuel consumption. The table refers to this as "Fuel Flow". The prediction by the machine learning model is shown in the table in the second column under heading "Average Predicted Fuel Flow (kg/hr)". The actual fuel consumption experienced by the aircraft in the first column is shown in the third column labeled "Average Actual Fuel Flow (kg/hr)". The fifth column, labeled "Accuracy Improvement (kg/hr)" indicates how much better the model's subsequent predictions were over the original random prediction. For example, the accuracy improvement of the prediction for the MSN2 model is 500 kg/hr, meaning the 10,500 kg/hr prediction for the MSN2 was 500 kg/hr closer to the 10,000 kg/hr actual fuel consumption than the 11,000 kg/hr random prediction made for the generic Aircraft.

Next, the "Neural Network Gain" column is calculated by the training algorithm for the system, and as shown in the table, the neural network gain for MSN 1 is 1.5, for MSN 2 the neural network gain is 2, and for MSN 3 the neural network gain is 1.8. The "Simple Average" is included to compare to the Ranked Weighted Average described herein below. The "Ranked Weight" is calculated by dividing the "Accuracy Improvement" value for an aircraft by the summation of all the accuracy improvement values for all the aircraft. In this case, the summation of the accuracy improvement values is 1600 kg/hr, and therefore, the "Ranked Weight" for each of MSN 1-MSN 3 is respectively, the corresponding accuracy improvement number divided by 1600 kg/hr. For example, the accuracy improvement for MSN 1 is 800 kg/hr, and therefore, MSN 1's ranked weight is 800/1600, or 0.5. The "Weighted Network Gain" values are determined by multiplying the ranked weight for an aircraft by the neural network gain for an aircraft. For example, for MSN 2, the ranked weight is 0.3125 and the neural network gain is 2. The weighted network gain for MSN 2 is therefore 0.625. The "Sum of Weighted Network Gains" is a summation of all of the weighted network gains for the list of aircraft. And finally, the "Ranked Weighted Average Neural Network Gain" is determined by dividing the sum of the weighted network gains by a summation of the ranked weights for all the aircraft.

FIG. 4 illustrates a flow chart of an example method 400 for predicting a fuel consumption for a flight of an aircraft from a departure airport to an arrival airport. As shown at block 402, the method includes accessing, by one or more processors in communication with a non-transitory computer readable medium having executable instructions therein, a plurality of data points comprising historical flights from the departure airport to the arrival airport. As shown at blocks 404-412, upon execution of the executable instructions, the one or more processors are configured to perform various steps. As shown at step 404, the method includes building a central machine learning model for predicting the fuel consumption for the flight of the aircraft using the data points, the central machine learning model built using a machine learning algorithm and one or more of the plurality of data points. As shown at step 406, the method includes generating, by the central machine learning model, a first prediction of the fuel consumption for the flight of the aircraft.

As shown at step 408, the method 400 includes distributing a version of the central machine learning model along with the first prediction of the fuel consumption to one or more edge computing devices, each of the one or more edge computing devices being associated with an organization that operates the aircraft, and being in communication with a data store comprising organization-specific data usable by the one or more edge computing devices associated with the organization to train the version of the central machine learning model received thereby with the organization-specific data. As shown at step 410, the method includes receiving, at the central machine learning model from the one or more edge computing devices, a neural network gain between the first prediction and an organization-specific prediction of the fuel consumption for the flight of the aircraft generated by the version of the central machine learning model trained with the organization-specific data, the neural network gain being based on a weighted difference between the first prediction and the organization-specific prediction and an actual fuel consumption for the flight from the departure airport to the arrival airport. As shown at step 412, the method includes updating the central machine learning model based on the neural network gain from the one or more edge computing devices to generate a revised prediction of the fuel consumption for the flight of the aircraft.

According to example implementations of the present disclosure, the system 200 for predicting a fuel consumption for a flight of an aircraft from a departure airport to an arrival airport is implemented by various means. Means for implementing the system includes hardware, alone or under direction of one or more computer programs from a computer-readable storage medium. In some examples, one or more apparatuses are configured to function as or otherwise implement the system shown and described herein. In examples involving more than one apparatus, the respective apparatuses are connected to or otherwise in communication with one another in a number of different manners, such as directly or indirectly via a wired or wireless network or the like.

Figure 5:
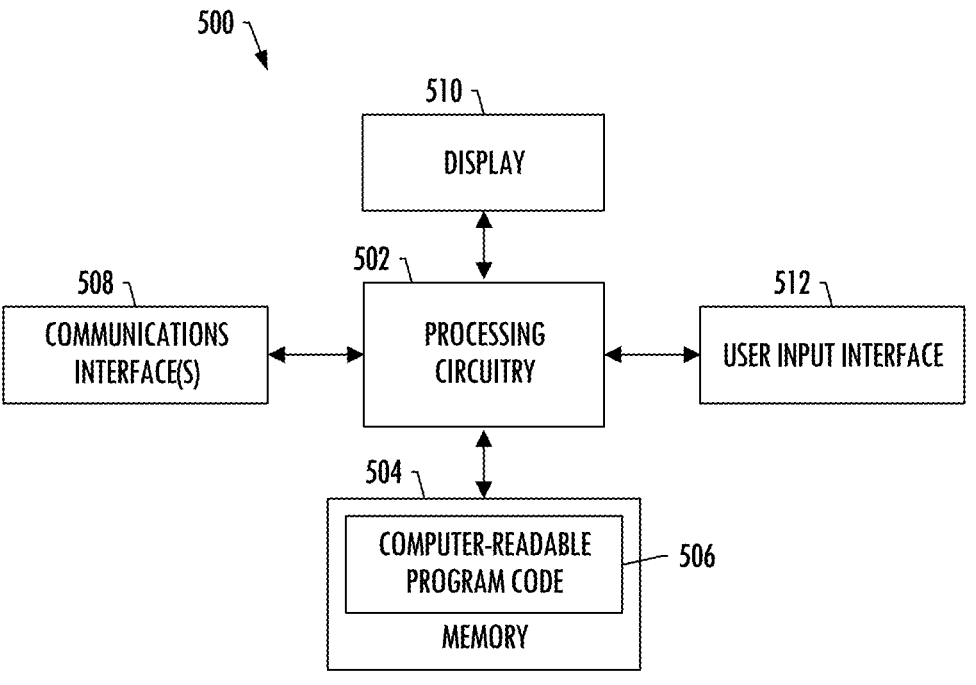
FIG. 5 illustrates an example apparatus for performing the method and other functions described herein, according to some embodiments of the present disclosure.

FIG. 5 illustrates an apparatus 500 capable of implementing the system 200 of FIG. 2 for predicting a fuel consumption for a flight of an aircraft from a departure airport to an arrival airport. The apparatus 500 is an example device that is used to implement the methods and functions described above with respect to the system for predicting a fuel consumption for a flight of an aircraft. Generally, an apparatus of exemplary implementations of the present disclosure comprises, includes, or is embodied in one or more fixed or portable electronic devices. Examples of suitable electronic devices include a microcontroller, controller, smartphone, tablet computer, laptop computer, desktop computer, workstation computer, server computer or the like. The apparatus includes one or more of each of a number of components such as, for example, processing circuitry 502 (e.g., processor unit or computer processor) connected to a memory 504 (e.g., storage device).

The processing circuitry 502 is composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which is packaged as an integrated circuit or multiple interconnected integrated circuits (an integrated circuit at times more commonly referred to as a "chip"). The processing circuitry is configured to execute computer programs, which are stored onboard the processing circuitry or otherwise stored in the memory 504 (of the same or another apparatus).

The processing circuitry 502 includes a number of processors, a multi-core processor or some other type of processor, depending on the particular implementation. Further, the processing circuitry is implemented using a number of heterogeneous processor systems in which a main processor is present with one or more secondary processors on a single chip. As another illustrative example, the processing circuitry is a symmetric multi-processor system containing multiple processors of the same type. In yet another example, the processing circuitry is embodied as or otherwise include one or more ASICs, FPGAs or the like. Thus, although the processing circuitry is capable of executing a computer program to perform one or more functions, the processing circuitry of various examples is capable of performing one or more functions without the aid of a computer program. In either instance, the processing circuitry is appropriately programmed to perform functions or operations according to example implementations of the present disclosure.

The memory 504 is generally any piece of computer hardware that is capable of storing information such as, for example, data, computer programs (e.g., computer-readable program code 506) and/or other suitable information either on a temporary basis and/or a permanent basis. The memory includes volatile and/or non-volatile memory, and is fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks include compact disk-read only memory (CD-ROM), compact disk-read/write (CD-R/

W), DVD or the like. In various instances, the memory is referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein generally refer to a computer-readable storage medium or computer-readable transmission medium.

In addition to the memory 504, the processing circuitry 502 is also connected to one or more interfaces for displaying, transmitting and/or receiving information. The interfaces include a communications interface 508 (e.g., communications unit) and/or one or more user interfaces. The communications interface is configured to transmit and/or receive information, such as to and/or from other apparatus(es), network(s) or the like. The communications interface is configured to transmit and/or receive information by physical (wired) and/or wireless communications links. Examples of suitable communication interfaces include a network interface controller (NIC), wireless NIC (WNIC) or the like.

The user interfaces include a display 510 and/or one or more user input interfaces 512 (e.g., input/output unit). The display is configured to present or otherwise display information to a user, suitable examples of which include a liquid crystal display (LCD), light-emitting diode display (LED), plasma display panel (PDP) or the like. The user input interfaces are wired or wireless, and are configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces further include one or more interfaces for communicating with peripherals such as printers, scanners or the like.

As indicated above, program code instructions are stored in memory, and executed by processing circuitry that is thereby programmed, to implement functions of the systems, subsystems, tools and their respective elements described herein. As will be appreciated, any suitable program code instructions are loaded onto a computer or other programmable apparatus from a computer-readable storage medium to produce a particular machine, such that the particular machine becomes a means for implementing the functions specified herein. These program code instructions are also stored in a computer-readable storage medium that direct a computer, a processing circuitry or other programmable apparatus to function in a particular manner to thereby generate a particular machine or particular article of manufacture. The instructions stored in the computer-readable storage medium produce an article of manufacture, where the article of manufacture becomes a means for implementing functions described herein. The program code instructions are retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions are performed sequentially such that one instruction is retrieved, loaded and executed at a time. In some example implementations, retrieval, loading and/or execution are performed in parallel such that multiple instructions are retrieved, loaded, and/or executed together. Execution of the program code instructions produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, the apparatus 500 includes the processing circuitry 502 and the computer-readable storage medium or memory 504 coupled to the processing circuitry, where the processing circuitry is configured to execute computer-readable program code 506 stored in the memory. It will also be understood that one or more functions, and combinations of functions, are implemented by special purpose hardware-based computer systems and/or processing circuitry which perform the specified functions, or combinations of special purpose hardware and program code instructions.

Many modifications and other implementations of the inventions set forth herein will come to mind to one skilled in the art to which these disclosed implementations pertain having the benefit of the teachings presented in the foregoing descriptions and the associated drawings. Therefore, it is to be understood that implementations of the invention are not to be limited to the specific implementations disclosed and that modifications and other implementations are intended to be included within the scope of the invention. Moreover, although the foregoing descriptions and the associated drawings describe example implementations in the context of certain example combinations of elements and/or functions, it should be appreciated that different combinations of elements and/or functions are provided by alternative implementations without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

It should be understood that although the terms first, second, etc. are used herein to describe various steps or calculations, these steps or calculations should not be limited by these terms. These terms are only used to distinguish one operation or calculation from another. For example, a first calculation is termed a second calculation, and, similarly, a second step is termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular implementations only and is not intended to be limiting.

That which is claimed:

1. A method for predicting a fuel consumption for a flight of an aircraft from a departure airport to an arrival airport, the method comprising:

accessing, by one or more processors in communication with a non-transitory computer readable medium having executable instructions therein, a plurality of data points comprising historical flights from the departure airport to the arrival airport, wherein, upon execution of the executable instructions, the one or more processors are configured to perform steps comprising:

building a central machine learning model for predicting the fuel consumption for the flight of the aircraft using the data points, the central machine learning model built using a machine learning algorithm and one or more of the plurality of data points;

generating, by the central machine learning model, a first prediction of the fuel consumption for the flight of the aircraft;

distributing a version of the central machine learning model along with the first prediction of the fuel consumption to one or more edge computing devices, each of the one or more edge computing devices being associated with an organization that operates the aircraft, and being in communication with a data store comprising organization-specific data usable by the one or more edge computing devices associated with the organization to train the version of the central machine learning model received thereby with the organization-specific data;

receiving, at the central machine learning model from the one or more edge computing devices, a neural network gain between the first prediction and an organization-specific prediction of the fuel consumption for the flight of the aircraft generated by the version of the central machine learning model trained with the organization-specific data, the neural network gain being based on a weighted difference between the first prediction and the organization-specific prediction and an actual fuel consumption for the flight from the departure airport to the arrival airport;

updating the central machine learning model based on the neural network gain from the one or more edge computing devices to generate a revised prediction of the fuel consumption for the flight of the aircraft; and receiving, by the central machine learning model, edge neural network gains from two or more edge computing devices, wherein updating the central machine learning model based on the neural network gain comprises:

determining an accuracy of the organization-specific prediction generated by determining a difference between the organization-specific prediction and the actual fuel consumption for the flight; and calculating and assigning different weights to the edge neural network gains received from the two or more edge computing devices based on the difference, wherein the neural network gain is calculated using a weighted average of the edge neural network gains received from the two or more edge computing devices based on the different weights assigned to the two or more edge computing devices, and wherein updating the central machine learning model based on the neural network gain comprises training the central machine learning model to generate the revised prediction using the neural network gain calculated using the weighted average.

2. The method of claim 1, wherein the plurality of data points includes public data selected from the group consisting of: time of day, airline, location, flight distance, departure and arrival data points, environmental conditions, and filed flight plans containing historical fuel consumption of the aircraft.

3. The method of claim 1, wherein the organization-specific data includes proprietary data associated with the organization selected from the group consisting of: an actual flight plan of the aircraft including speed and altitude of the aircraft, weather along the flight plan, passenger reservation information for the aircraft, cargo weight for the aircraft, fuel weight for the aircraft, performance characteristics of the aircraft, and airline or organization control decisions.

4. The method of claim 1, wherein the central machine learning model is a deep neural network (DNN) model containing a first number of layers and neurons, the first number of layers and neurons corresponding to the plurality of data points, wherein the method further comprises training the DNN model using the first number of layers and neurons corresponding to the plurality of data points.

5. The method of claim 4, wherein the version of the central machine learning model includes the DNN model further trained by the one or more edge computing devices using the organization-specific data, wherein the DNN model further trained by the one or more edge computing devices using the organization-specific data includes the first number of layers and neurons and a second number of layers and neurons corresponding to the organization-specific data.

6. The method of claim 5, wherein the DNN model is further trained using the first number of layers and neurons corresponding to the plurality of data points and the second number of layers and neurons corresponding to the organization-specific data.

7. The method of claim 1, wherein each of the one or more edge computing devices determines a corresponding edge neural network gain by:

executing multiple training iterations to train the version of the central machine learning model, wherein at a first training iteration, a random neural network gain is applied to the version of the central machine learning model, and a first iteration of the organization-specific prediction is generated based on the random neural network gain; and at subsequent training iterations, updating the random neural network gain to obtain the corresponding edge neural network gain of the edge computing device and applying the corresponding edge neural network gain to the version of the central machine learning model, and generating subsequent iterations of the organization-specific prediction based on the corresponding edge neural network gain.

8. The method of claim 7, wherein updating the random neural network gain comprises:

performing a comparison of the first iteration of the organization-specific prediction to the actual fuel consumption for the flight; and updating the random neural network gain to the corresponding edge neural network gain based on the comparison.

9. The method of claim 8, wherein receiving the edge neural network gains comprises receiving each of the corresponding edge neural network gains from the one or more edge computing devices by the central machine learning model.

10. The system of claim 1, wherein the different weights are assigned to corresponding edge computing devices based in descending order, wherein a highest weight is assigned to a edge computing device that produced the organization-specific prediction with a smallest difference.

11. A system for predicting a fuel consumption for a flight of an aircraft from a departure airport to an arrival airport, the system comprising:

one or more processors in communication with a non-transitory computer readable medium having executable instructions therein, wherein, upon execution of the executable instructions, the one or more processors are configured to:

access a plurality of data points comprising historical flights from the departure airport to the arrival airport;

build a central machine learning model for predicting the fuel consumption for the flight of the aircraft using the data points, the central machine learning model built using a machine learning algorithm and one or more of the plurality of data points;

generate, using the central machine learning model, a first prediction of the fuel consumption for the flight of the aircraft;

distribute a version of the central machine learning model along with the first prediction of the fuel consumption to one or more edge computing devices, each of the one or more edge computing devices being associated with an organization that operates the aircraft, and being in communication with a data store comprising organization-specific data usable by the one or more edge computing devices associated with the organization to train the version of the central machine learning model received thereby with the organization-specific data;

receive, at the central machine learning model from the one or more edge computing devices, a neural network gain between the first prediction and an organization-specific prediction of the fuel consumption for the flight of the aircraft generated by the version of the central machine learning model trained with the organization-specific data, the neural network gain being based on a weighted difference between the first prediction and the organization-specific prediction and an actual fuel consumption for the flight from the departure airport to the arrival airport;

update the central machine learning model based on the neural network gain from the one or more edge computing devices to generate a revised prediction of the fuel consumption for the flight of the aircraft receive edge neural network gains, wherein updating the central machine learning model based on the neural network gain comprises:

determining an accuracy of the organization-specific prediction generated by determining a difference between the organization-specific prediction and the actual fuel consumption for the flight; and calculating and assigning different weights to the edge neural network gains received from two or more edge computing devices based on the difference, wherein the neural network gain is calculated using a weighted average of the edge neural network gains received from the two or more edge computing devices based on the different weights assigned to the two or more edge computing devices, and wherein updating the central machine learning model based on the neural network gain comprises training the central machine learning model to generate the revised prediction using the neural network gain calculated using the weighted average.

12. The system of claim 11, wherein the plurality of data points includes public data selected from the group consisting of: time of day, airline, location, flight distance, departure and arrival data points, environmental conditions, and filed flight plans containing historical fuel consumption of the aircraft.

13. The system of claim 11, wherein the organization-specific data includes proprietary data associated with the organization selected from the group consisting of: an actual flight plan of the aircraft including speed and altitude of the aircraft, weather along the flight plan, passenger reservation information for the aircraft, cargo weight for the aircraft, fuel weight for the aircraft, performance characteristics of the aircraft, and airline or organization control decisions.

14. The system of claim 11, wherein the central machine learning model is a deep neural network (DNN) model containing a first number of layers and neurons, the first number of layers and neurons corresponding to the plurality of data points, p1 wherein the one or more processors are configured to train the DNN model using the first number of layers and neurons corresponding to the plurality of data points.

15. The system of claim 14, wherein the version of the central machine learning model includes the DNN model further trained by the one or more edge computing devices using the organization-specific data, wherein the DNN model further trained by the one or more edge computing device using the organization-specific data includes the first number of layers and neurons and a second number of layers and neurons corresponding to the organization-specific data.

16. The system of claim 15, wherein the DNN model is further trained using the first number of layers and neurons corresponding to the plurality of data points and the second number of layers and neurons corresponding to the organization-specific data.

17. The system of claim 11, wherein each of the one or more edge computing devices is configured to determine a corresponding edge neural network gain, including the one or more edge computing devices configured to:

execute multiple training iterations to train the version of the central machine learning model, wherein at a first training iteration, a random neural network gain is applied to the version of the central machine learning model, and a first iteration of the organization-specific prediction is generated based on the random neural network gain; and at subsequent training iterations, update the random neural network gain to obtain the corresponding edge neural network gain of the edge computing device and apply the corresponding edge neural network gain to the version of the central machine learning model, and generate subsequent iterations of the organization-specific prediction based on the corresponding edge neural network gain.

18. The system of claim 17, wherein the one or more edge computing devices configured to update the random neural network gain comprises the one or more edge computing devices configured to:

perform a comparison of the first iteration of the organization-specific prediction to the actual fuel consumption for the flight; and update the random neural network gain to the corresponding edge neural network gain based on the comparison.

19. The system of claim 18, wherein the one or more processors being configured to receive the edge neural network gains comprises the one or more processors being further configured to receive each of the corresponding edge neural network gains from the one or more edge computing devices at the central machine learning model.

20. The system of claim 11, wherein the different weights are assigned to corresponding edge computing devices based in descending order, wherein a highest weight is assigned to a edge computing device that produced the organization-specific prediction with a smallest difference.

* * * * *